United States Patent
Van Nigtevecht et al.

(10) Patent No.: US 11,585,582 B2
(45) Date of Patent: Feb. 21, 2023

(54) COOLING MEMBER FOR A MOBILE ICE RINK

(71) Applicant: Ice-World Holding B.V., Soest (NL)

(72) Inventors: Hugo Jacob Van Nigtevecht, Weesp (NL); Guido William Molenaar, Amersfoort (NL); Wilhelmus Adolfus Johannes Marie Hoeks, Baarn (NL)

(73) Assignee: ICE-WORLD HOLDING B.V., Soest (NL)

( * ) Notice: Subject to any disclaimer, the term of this patent is extended or adjusted under 35 U.S.C. 154(b) by 0 days.

(21) Appl. No.: 15/445,571

(22) Filed: Feb. 28, 2017

(65) Prior Publication Data

US 2017/0254576 A1    Sep. 7, 2017

(30) Foreign Application Priority Data

Mar. 2, 2016    (EP) ..................................... 16158284

(51) Int. Cl.
*F25C 3/02*      (2006.01)
*F16L 53/70*     (2018.01)

(52) U.S. Cl.
CPC ................ *F25C 3/02* (2013.01); *F16L 53/70* (2018.01); *F25C 2500/06* (2013.01)

(58) Field of Classification Search
CPC .......... F25C 3/02; F25C 2500/06; F25C 1/12; F25C 2400/02; F25C 2303/00; F16L 3/70; A63C 19/10; E01C 13/105; E04H 4/023

See application file for complete search history.

(56) References Cited

U.S. PATENT DOCUMENTS

| | | | |
|---|---|---|---|
| 2,069,811 A * | 2/1937 | Baer | E01C 13/105 62/235 |
| 3,000,193 A | 9/1961 | Crider | |
| 4,611,471 A | 9/1986 | Ohashi | |
| 4,693,079 A | 9/1987 | Wuensche et al. | |
| 4,979,373 A | 12/1990 | Huppee | |
| 5,174,366 A | 12/1992 | Nagakura | |
| 5,493,872 A * | 2/1996 | Hibino | F25C 1/12 239/600 |
| 5,970,734 A * | 10/1999 | Stillwell | F25C 3/02 285/305 |
| 6,253,558 B1 | 7/2001 | Stillwell | |
| 6,334,439 B1 * | 1/2002 | Specht | F24D 5/08 126/91 A |

(Continued)

FOREIGN PATENT DOCUMENTS

| | | |
|---|---|---|
| CN | 1259196 A | 7/2000 |
| DE | 1000649 B | 1/1957 |

(Continued)

OTHER PUBLICATIONS

European Search Report for European patent application No. 16158284. 6, dated Jul. 6, 2016, 5 pages.

(Continued)

*Primary Examiner* — Miguel A Diaz
(74) *Attorney, Agent, or Firm* — Steven M. Koehler; Westman, Champlin & Koehler, P.A.

(57) ABSTRACT

A cooling member for a mobile ice rink includes a plurality of pipes for transporting a coolant, wherein the pipes comprise at least two sections coupled by a connector. Cooling elements are provided at the locations of the connectors.

20 Claims, 3 Drawing Sheets

(56) References Cited

U.S. PATENT DOCUMENTS

| | | | | |
|---|---|---|---|---|
| 7,089,753 | B2* | 8/2006 | Hoeks | F28F 9/26 62/235.1 |
| 9,777,441 | B2* | 10/2017 | Li | A63C 19/10 |
| 2003/0000239 | A1* | 1/2003 | Dawe | E01H 4/023 62/347 |
| 2005/0045318 | A1* | 3/2005 | Hoeks | F28F 9/26 165/172 |
| 2005/0067514 | A1* | 3/2005 | Bolduan | F16L 19/0286 239/600 |
| 2007/0296211 | A1* | 12/2007 | Huang | F16L 19/0283 285/334.5 |
| 2013/0313821 | A1* | 11/2013 | Manning | F16L 43/00 285/134.1 |
| 2015/0107694 | A1* | 4/2015 | Lenko | A63C 19/10 137/363 |
| 2016/0208978 | A1* | 7/2016 | Watanabe | F16L 57/00 |
| 2018/0023882 | A1* | 1/2018 | Jeong | F16K 21/04 137/844 |
| 2018/0056456 | A1* | 3/2018 | Janes | B23K 31/02 |

FOREIGN PATENT DOCUMENTS

| | | |
|---|---|---|
| EP | 1031809 A1 | 8/2000 |
| EP | 1462755 A1 | 9/2004 |
| FR | 2502896 A1 | 10/1982 |
| FR | 2677262 A1 | 12/1992 |
| FR | 2802292 A1 | 6/2001 |
| GB | 252516 A | 6/1926 |
| GB | 2051340 A | 1/1981 |
| GR | 1007249 B | 4/2011 |
| JP | H04-32399 A | 1/1994 |
| PL | 213454 B1 | 3/2013 |
| SU | 1664693 A1 | 7/1991 |
| WO | WO-2016193689 A1 * | 12/2016 ............. A63C 19/10 |

OTHER PUBLICATIONS

Office Action from the Chinese Patent Office for Chinese patent application No. 2017101164303, dated Nov. 5, 2019.
Second Office Action from the Chinese Patent Office for Chinese patent application No. 201710116430.3, dated Aug. 28, 2020.
Notice of Reasons for Rejection for Japanese patent application No. 2017-038037, dated Mar. 1, 2021, with English translation.
Third Office Action in corresponding Chinese patent application No. 201710116430.3 dated Mar. 23, 2021.
Fourth Office Action in corresponding Chinese patent application No. 201710116430.3 dated Aug. 18, 2021.

* cited by examiner

COOLING MEMBER FOR A MOBILE ICE RINK

BACKGROUND

The discussion below is merely provided for general background information and is not intended to be used as an aid in determining the scope of the claimed subject matter.

Aspects of the invention relate to a cooling member for a mobile ice rink comprising a plurality of pipes, typically at least substantially parallel pipes, for transporting a coolant, in particular a cooling liquid, such as glycol, wherein the pipes comprise at least two sections coupled by a connector.

Higher temperatures, direct sunlight, rain, and wind may bring about weak spots and/or irregularities in the ice of the rink near the connectors. Common measures to reduce or prevent such spots and/or irregularities from forming in the ice include increasing the flow of coolant or lowering the temperature of the coolant. These measures significantly reduce energy efficient.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

A cooling member includes cooling elements at the locations of connectors, preferably extending along and/or under the connectors.

In an embodiment, a cooling element is provided at at least 25% of the connectors, preferably at least 50% of the connectors, preferably at all of the connectors. In another embodiment, at least a plurality, preferably all of the cooling elements extend over at least 40% of the lengths of the connectors, preferably over the entire lengths of the connectors, at least when the cooling member is operational.

It was found that cooling of the water or ice is significantly less efficient at the connectors. The cooling member facilitates maintaining a more level skating surface and/or a more homogenous temperature of the ice and/or is more energy efficient.

In an embodiment, the cooling elements are configured to transport heat from the water or ice surrounding the connectors to the coolant in the pipes through at least one of conduction and convection, preferably such that the heat absorbed by the cooling elements at least substantially compensates, preferably by at least 70%, preferably at least 80%, preferably at least 90%, the difference between the heat absorption (per centimeter) of the connectors and the heat absorption (per centimeter) of the pipe sections. In a refinement, the cooling elements are thermally connected to the pipes, e.g. an integral part of or connected to the pipe sections.

The cooling elements can be made of a solid material, e.g. formed of solid aluminum rods. To enhance transport of heat from the water or ice surrounding the connectors, in an embodiment, at least a plurality, preferably all of the cooling elements comprise a channel connected to the lumen of the respective pipe. Thus, coolant from the pipes is fed to the cooling elements.

In a refinement, a first (entry) end of the channel is connected to the lumen of the pipe, the channel comprises a first portion extending along the connector, a U turn, and a second portion extending along the connector, and a second (return or exit) end of the channel is connected to the pipe, downstream from the first end.

To set or regulate the flow of coolant through the cooling element, in an embodiment, it comprises a flow restriction in the lumen of the pipe, located between the first end of the channel and the second (return or exit) end of the channel. In a refinement, the flow restriction causes 1 to 25%, preferably 1 to 15%, preferably 2 to 5% of the coolant to flow through the channel and back to the main stream of coolant downstream from the flow restriction.

The cooling elements can be e.g. a(n integral) part of the pipe sections being formed of a single unitary body or extensions connected to the pipe sections. In an embodiment, the cooling elements comprises two or more components, e.g. two halves, that are glued together, e.g. by means of a two-part methacrylate adhesive, preferably a two-part methacrylate adhesive, such as Plexus® MA830. Other suitable means of joining the components include welding and bolting. Combinations, e.g. a combination of gluing and bolting, can be employed e.g. to withstand harsh conditions or increase service life. In a refinement, a gasket is placed between at least two of the components.

In an embodiment, a pair of cooling elements is provided on alternate pipes. Thus, no cooling elements need to be present on the remaining pipes, simplifying assembly of the cooling members.

In a further embodiment, the pipes are made of metal, in particular aluminum, and the connectors are made of a synthetic material, such as a thermoplast or an elastomer, e.g. a rubber, e.g. EPDM (ethylene propylene diene monomer). In another embodiment, the connector comprises a joint, in particular a flexible tube made of rubber, that enables the sections to be folded at the connectors and relative to each other, e.g. between a unfolded state of the cooling member for operation and a folded state for transport.

In another embodiment, the pipe sections have a length in a range from 0.5 to 11 meters, preferably in a range from 4 to 8 meters.

To facilitate installation on location, e.g. on a square or in a park, in an embodiment, the cooling member comprises a feed manifold and a discharge manifold. The parallel pipes are connected to the manifolds. To form an ice rink, the manifolds are coupled, in series or in parallel, to a cooling unit.

An aspect of the invention also relates to a pipe for use in a cooling member as described above, comprising at least two sections coupled by a connector, in particular a flexible tube made of rubber that enables the sections to be folded at the connectors and relative to each other. A cooling element at the location of the connector, preferably a cooling element that extends along, about, above and/or under the connector.

An aspect of the invention further relates to an ice rink comprising one or more cooling members or pipes.

BRIEF DESCRIPTION OF THE DRAWINGS

Aspects of the invention will now be explained in more detail with reference to the Figures, which show an embodiment of the present cooling member.

DETAILED DESCRIPTION

Figure 1:
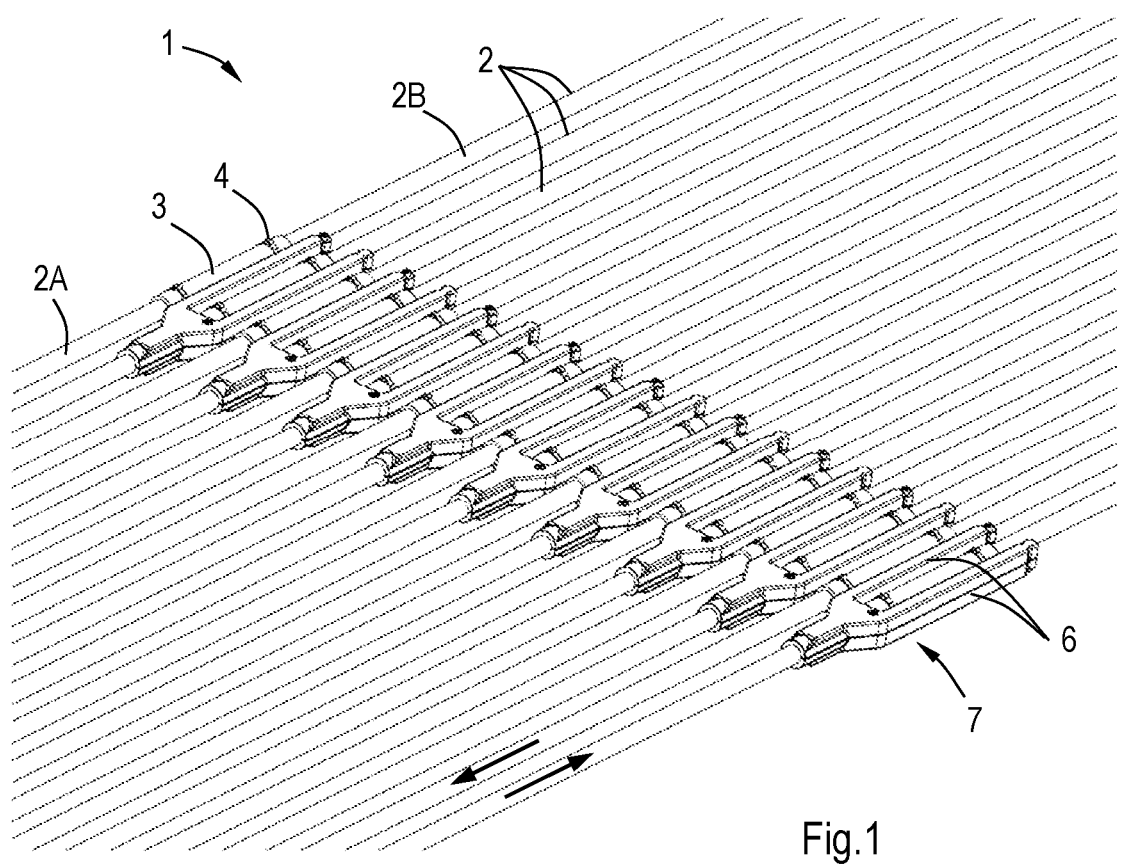
FIG. 1 is a perspective view of a cooling member comprising flexible joints and cooling elements extending along the joints.

FIG. 1 shows a preferred example of a cooling member 1 for use in a mobile ice rink. The cooling member comprises a plurality of at least substantially parallel rigid pipes 2, e.g. from extruded aluminium, for transporting a coolant, such as glycol. Each of the pipes comprises at least two sections 2A, 2B coupled by a joint 3. In this example, the joint comprises a flexible tube made of rubber, e.g. EPDM (ethylene propylene diene monomer), the ends of which have been slit over the ends of the pipe sections and are secured thereto with hose clamps 4 to establish a strong and liquid tight connection.

On one end of the cooling member 1, the ends of the pipes 2 are connected to feed and discharge manifolds 27 and 28 alternately. On the other end of the cooling member, the ends of the pipes are provided, in pairs, with U-bends or with a collector such that each pair of pipes has a feed pipe (connected to the feed manifold) and a return pipe (connected to the discharge manifold). To form an ice rink, a number of cooling members are positioned side by side and the manifolds of the cooling members are coupled, in series or in parallel, to a cooling unit (not shown). The flexible joints enable the sections of the cooling members to be folded relative to each other between an unfolded state of the cooling member for operation and a folded state for transport. Suitable manifolds, connections and further technical aspects are disclosed in EP 1 462 755.

Figure 2:
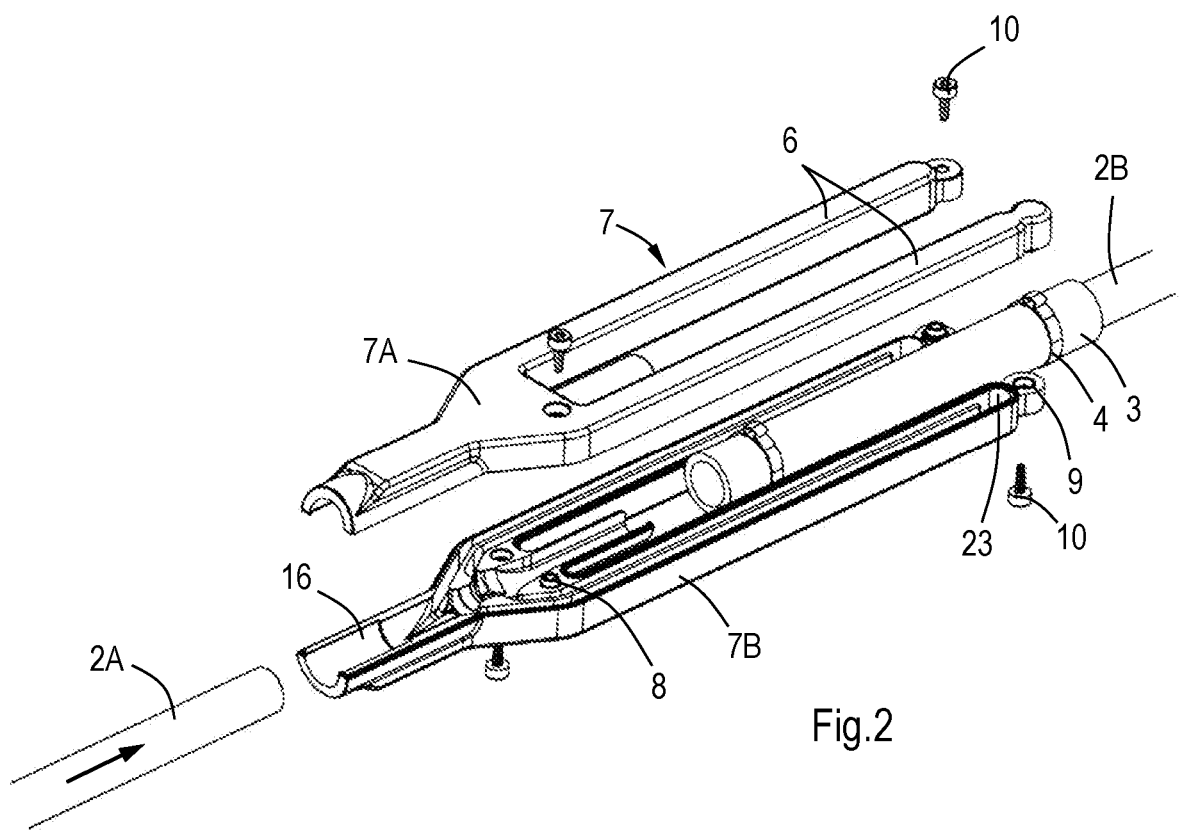
FIG. 2 is an exploded view of a pair of cooling elements shown in FIG. 1.

In the operational (unfolded) state of the cooling member 1, a cooling element 6 extends along the entire length of each joint 3. In this example, the cooling elements 6 are formed in pairs in end pieces 7 on alternate pipe sections 2A. As shown in FIG. 2, the end pieces each comprise two halves 7A, 7B, e.g. made from molded aluminium and provided with positioning and fastening elements, e.g. projections 8 and recesses 9 (FIG. 2) and bolts 10 (FIG. 3) and threads, respectively. The halves define, once joined e.g. by means of a two-part methacrylate adhesive and/or the bolts, a central channel 15, two tubular connector sections 16, 17 and two cooling elements 6. A first tubular connector section 16 has an inner diameter that is slightly larger than the outer diameter of the pipe section 2A, such that the end piece 7 can be placed over the end of a pipe section 2A and secured in place e.g. by means of an adhesive and/or clamping. A second tubular connector section 17 has an outer diameter that is slightly smaller than the inner diameter of the tubular joint 3, such that the joint can be placed over the connector section 17 and secured in place, e.g. by means of a hose clamp 4, as already mentioned.

Figure 3:
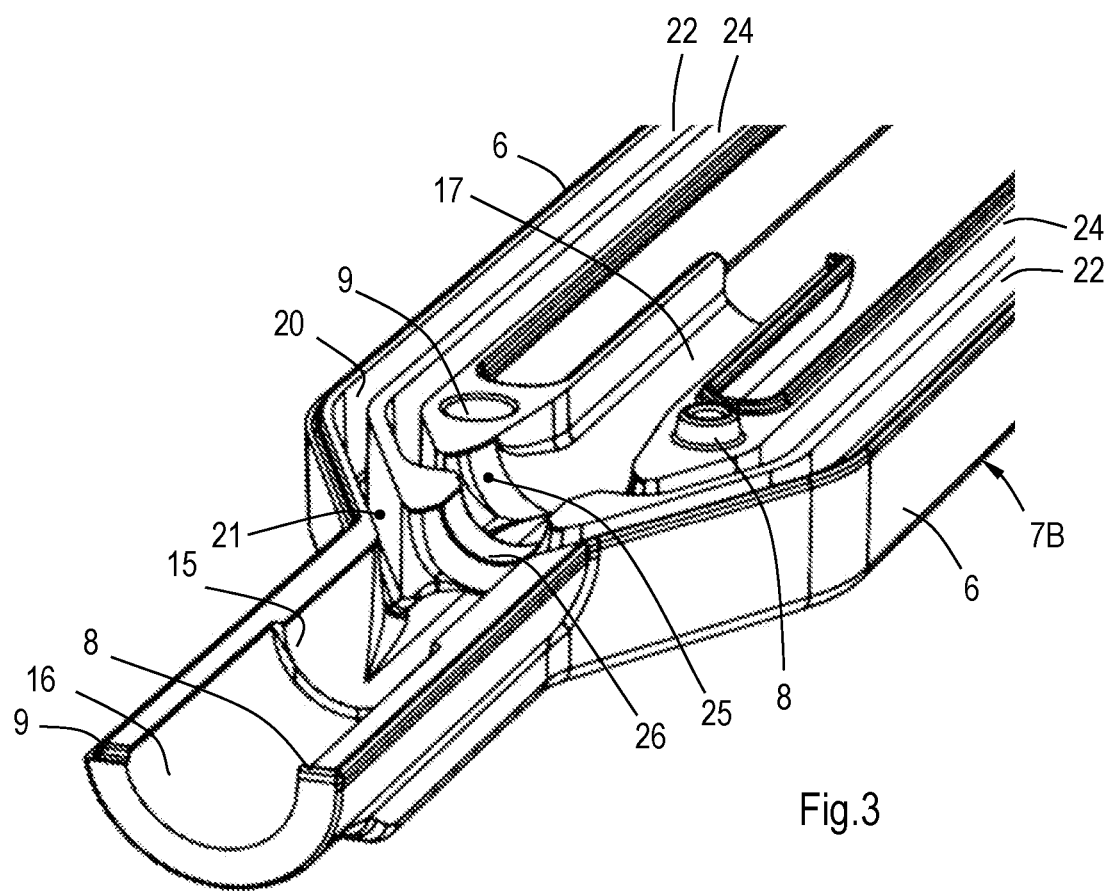
FIG. 3 is an enlarged detail of the exploded view shown in FIG. 2.
Figure 4:
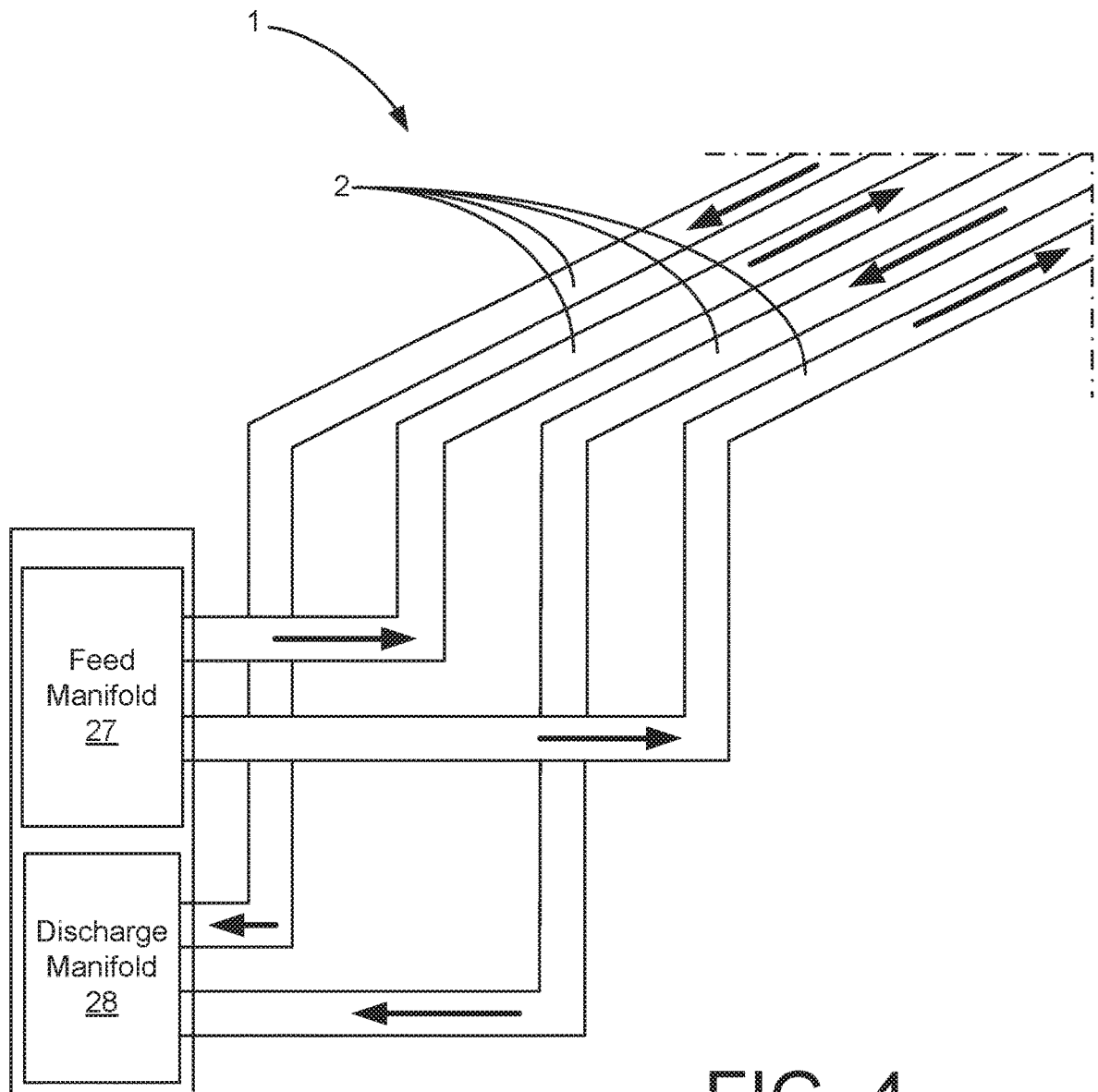
FIG. 4 is a perspective view of one end of the cooling member in FIG. 1.

As shown in FIGS. 2 and 3, each of the cooling elements comprises an internal channel 20 for coolant. The channel comprises, seen in flow direction (arrow) an entry 21, a first portion 22 extending through the element and along the joint, a U (180°) turn 23 (FIG. 2), a second portion 24 extending through the element and along the joint, and a return 25 connected to the central channel 15, downstream from the entry 21. A flow restriction 26 is defined in the central channel 15 between the entries and returns of channels in the pair of cooling elements. In this particular example, the diameter, shape and surface of the flow restriction and the entries and returns are configured to direct 3% of the coolant flow to each of the channels in the cooling elements and 94% straight on and, moreover, such that the distribution of coolant flow over the central channel and the channels in de cooling elements is independent of the flow direction.

During operation, explained with reference to FIG. 2, the coolant flows through the pipe and into the end piece. 3% of coolant is directed to each of the cooling elements, i.e. through the entry, the first portion, the first portion extending along the joint, the U turn, and the second portion extending along the joint, thus cooling the water or ice surrounding the joints, and back to the pipe via the return.

The cooling member according to present invention facilitates maintaining a more homogenous skating surface, e.g. in terms of surface continuity and temperature of the ice, and/or is more energy efficient.

The invention is not restricted to the above-described embodiments, which can be varied in a number of ways within the scope of the claims. For instance, instead of arranging the cooling elements in pairs, end pieces with a single cooling element can be provided on each pipe section. Also, instead of flexible joints, the pipe sections can be coupled by means of rigid connectors that e.g. enable the pipes to be assembled and disassembled on location.

What is claimed is:

1. A cooling member for a mobile ice rink comprising:
a plurality of pipes for transporting a coolant, wherein at least some of the pipes comprise at least two sections;
a plurality of connectors, each connector connecting two pipe sections of a pipe, the pipe sections and the connector defining a coolant flow channel for the coolant, from one of the pipe sections, via the connector, to the other pipe section; and
a plurality of elements, each element being outside the coolant flow channel and extending parallel to, and along one side of, at least one adjacent connector, past an end of one of the pipe sections, toward the other pipe section, wherein the elements comprise a material having a higher heat conductivity than a material of the connector so as to transport heat from water or ice adjacent the connectors.

2. The cooling member according to claim 1, wherein the elements are provided on at least 25% of the connectors.

3. The cooling member according to claim 1, wherein the elements extend over at least 40% of the lengths of the corresponding connectors.

4. The cooling member according to claim 1, wherein the elements transport heat from the water or the ice adjacent the connectors to the coolant in the pipes through at least one of conduction and convection.

5. The cooling member according to claim 4, wherein the elements are configured to compensate a difference between heat absorption of the connectors and heat absorption of the at least two sections.

6. The cooling member according to claim 4, wherein each element comprises a channel branching off from a lumen of a pipe of the plurality of pipes.

7. The cooling member according to claim 6, wherein a first end of the channel is connected to the lumen of the pipe, the channel comprises a first portion extending along the connector, a U turn, and a second portion extending along the connector, and wherein a second end of the channel is connected to the lumen of the pipe, downstream from the first end.

8. The cooling member according to claim 7, comprising a flow restriction in the lumen of the pipe, located between the first end of the channel and the second end of the channel.

9. The cooling member according to claim 1, wherein the elements extend along, about, above or under the connectors; are part of the at least two sections; or are extensions of the at least two sections.

10. The cooling member according to claim 1, wherein two elements are provided on each alternate pipe of the plurality of pipes.

11. The cooling member according to claim 1, wherein the pipes are made of metal and the connectors are made of a synthetic material.

12. The cooling member according to claim 1, wherein the connector comprises a joint that enables the sections to be folded at the connectors and relative to each other.

13. The cooling member according to claim 1, comprising a feed manifold and a discharge manifold, wherein the plurality of pipes is connected to the feed and discharge manifolds.

14. The cooling member according to claim 1, wherein the elements are provided on at least 50% of the connectors.

15. The cooling member according to claim 1, wherein at least one element is provided at all of the connectors.

16. The cooling member according to claim 12 wherein the connector comprises a flexible tube made of rubber.

17. A pipe for use in a cooling member, the pipe comprising:
first and second pipe sections coupled by a foldable connector, the first and second pipe sections and the connector defining a coolant flow channel, the first and second pipe sections and the connector configurable to an unfolded position wherein the first and second pipe sections and connector are aligned; and
at least one element outside the coolant flow channel at one side of the connector and extending along and parallel to the connector, past an end of the first pipe section, toward the second pipe section, in the unfolded position, wherein the at least one element is made of a material having a higher heat conductivity than a material of the connector so as to transport heat from water or ice adjacent the connector.

18. The pipe according to claim 17 wherein the connector comprises a flexible tube made of rubber.

19. An ice rink comprising at least one cooling member, the at least one cooling member comprising:
a plurality of pipes defining a coolant flow channel for transporting a coolant, wherein at least some of the pipes comprise at least two pipe sections coupled by a foldable connector enabling folding of the cooling member between an unfolded state for operation and a folded state; and
a plurality of elements, each element being outside the coolant flow channel and extending parallel to, and along one side of, an adjacent connector, past an end of one of the pipe sections, toward the other pipe section, wherein the elements are made of a material having a higher heat conductivity than a material of the connector so as to transport heat from water or ice adjacent the connectors.

20. The cooling member of claim 1, wherein the elements comprise solid rods.

* * * * *